United States Patent
VanLandingham et al.

(10) Patent No.: US 10,967,875 B2
(45) Date of Patent: Apr. 6, 2021

(54) CONTROL SYSTEM FOR AUTONOMOUS ALL-TERRAIN VEHICLE (ATV)

(71) Applicant: Honda Motor Co., Ltd., Tokyo (JP)

(72) Inventors: Joshua D. VanLandingham, Marysville, OH (US); Maruthi Govindarajan, Dublin, OH (US); Kavya Vittala, Lewis Center, OH (US); Lichao Ma, Santa Clara, CA (US)

(73) Assignee: Honda Motor Co., Ltd., Tokyo (JP)

( * ) Notice: Subject to any disclaimer, the term of this patent is extended or adjusted under 35 U.S.C. 154(b) by 152 days.

(21) Appl. No.: 15/910,832

(22) Filed: Mar. 2, 2018

(65) Prior Publication Data
US 2019/0210612 A1   Jul. 11, 2019

Related U.S. Application Data

(60) Provisional application No. 62/613,943, filed on Jan. 5, 2018.

(51) Int. Cl.
*B60W 50/02* (2012.01)
*G05D 1/02* (2020.01)
(Continued)

(52) U.S. Cl.
CPC ............ *B60W 50/02* (2013.01); *B60L 1/00* (2013.01); *B60W 10/06* (2013.01); *B60W 10/08* (2013.01);
(Continued)

(58) Field of Classification Search
CPC ............ B60W 10/20; B60W 2420/42; B60W 2550/10; G08G 1/167; G08G 1/165; G01C 21/20; G05B 19/042; G05B 2219/2637; G05D 1/0225; G05D 1/0231; G05D 1/0278; G05D 2201/0213; G05D 1/0274; G05D 1/0246; G05D 1/0011; G05D 1/0094; G05D 1/0276; G05D 1/0217; G05D 1/0223; G05D 1/0214; G05D 1/0212; G05D 1/027; G05D 1/0229; G05D 1/0289; G05D 1/106; G05D 2201/0207; G05D 2201/0212; G05D 1/00; G05D 1/0077; G05D 2201/02;
(Continued)

(56) References Cited

U.S. PATENT DOCUMENTS

6,442,708 B1 * 8/2002 Dierauer ............ H04L 41/0677
714/25
7,840,355 B2  11/2010 Breed et al.
(Continued)

*Primary Examiner* — Tuan C To
*Assistant Examiner* — Paul A Castro
(74) *Attorney, Agent, or Firm* — Mark E. Duell; Rankin Hill & Clark LLP (57) ABSTRACT

According to one aspect, an autonomous all-terrain vehicle (ATV) may include a controller receiving a command associated with autonomous driving and monitoring components of the autonomous ATV, a location unit determining a current location associated with the autonomous ATV and a destination location associated with the command, a navigation module determining one or more driving parameters based on map data associated with a path from the current location to the destination location, and a safety logic implementing an emergency stop based on an error determined by the controller. The controller may monitor the location unit and the navigation module for the error.

20 Claims, 7 Drawing Sheets

(51) Int. Cl.
*B60W 10/06* (2006.01)
*B60W 10/08* (2006.01)
*B60W 10/18* (2012.01)
*B60W 10/20* (2006.01)
*G05D 1/00* (2006.01)
*B60L 1/00* (2006.01)

(52) U.S. Cl.
CPC ............ *B60W 10/18* (2013.01); *B60W 10/20* (2013.01); *G05D 1/0055* (2013.01); *G05D 1/024* (2013.01); *G05D 1/0214* (2013.01); *G05D 1/0274* (2013.01); *G05D 1/0278* (2013.01); *B60W 2300/362* (2013.01); *B60W 2420/52* (2013.01); *B60W 2510/20* (2013.01); *B60W 2510/244* (2013.01); *B60W 2520/10* (2013.01); *B60W 2520/28* (2013.01); *B60W 2530/209* (2020.02); *B60W 2556/50* (2020.02); *B60W 2710/0605* (2013.01); *B60W 2710/08* (2013.01); *B60W 2710/18* (2013.01); *B60W 2710/20* (2013.01); *B60W 2720/10* (2013.01); *G05D 2201/0213* (2013.01)

(58) Field of Classification Search
CPC .......... G06K 9/00798; B60K 2370/178; B64C 39/024; B64C 2201/042; B64C 2201/141; B64C 2201/128; B64C 2201/208; B64C 2201/12; B64C 39/02; B64C 2201/126; B64C 2201/145; B64C 1/30; B64C 25/405; B64C 27/006
See application file for complete search history.

(56) References Cited

U.S. PATENT DOCUMENTS

| | | |
|---|---|---|
| 7,944,340 B1 * | 5/2011 | Ghabra ................... B60R 25/00 307/10.1 |
| 7,979,173 B2 | 7/2011 | Breed |
| 8,036,788 B2 | 10/2011 | Breed |
| 8,050,863 B2 | 11/2011 | Trepagnier et al. |
| 8,126,642 B2 | 2/2012 | Trepagnier et al. |
| 8,280,595 B2 | 10/2012 | Foster et al. |
| 8,352,111 B2 | 1/2013 | Mudalige |
| 8,352,112 B2 | 1/2013 | Mudalige |
| 9,043,016 B2 | 5/2015 | Filippov et al. |
| 9,360,867 B2 | 6/2016 | Ju et al. |
| 9,396,661 B2 | 7/2016 | Okamoto |
| 10,042,359 B1 * | 8/2018 | Konrardy ................ B60L 58/12 |
| 2007/0219666 A1 * | 9/2007 | Filippov .............. G05D 1/0061 700/245 |
| 2010/0106356 A1 * | 4/2010 | Trepagnier ............ G01S 17/023 701/25 |
| 2015/0234382 A1 | 8/2015 | Ju et al. |
| 2015/0331422 A1 | 11/2015 | Hartung et al. |
| 2017/0097640 A1 | 4/2017 | Wang et al. |
| 2017/0123422 A1 | 5/2017 | Kentley et al. |
| 2017/0185956 A1 | 6/2017 | Göllü |
| 2017/0227957 A1 * | 8/2017 | Cesarano ............ G05D 1/0214 |
| 2018/0275654 A1 * | 9/2018 | Merz ................... G08G 5/0086 |

* cited by examiner

CONTROL SYSTEM FOR AUTONOMOUS ALL-TERRAIN VEHICLE (ATV)

CROSS-REFERENCE TO RELATED APPLICATIONS

This application claims the benefit of U.S. Provisional Patent Application, Ser. No. 62/613,943 entitled "CONTROL SYSTEM FOR AUTONOMOUS ALL-TERRAIN VEHICLE (ATV)", filed on Jan. 5, 2018; the entirety of the above-noted application(s) is incorporated by reference herein.

BACKGROUND

An autonomous vehicle is an unmanned vehicle which is generally capable of sensing its environment and navigating without input from a driver. An autonomous vehicle may perform autonomous driving by recognizing and determining surrounding environments through various sensors attached to the autonomous vehicle. Further, an autonomous vehicle may enable a destination to be set and move to the set destination via autonomous driving.

BRIEF DESCRIPTION

According to one aspect, an autonomous all-terrain vehicle (ATV) may include a controller receiving a command associated with autonomous driving and monitoring components of the autonomous ATV, a location unit determining a current location associated with the autonomous ATV and a destination location associated with the command, a navigation module determining one or more driving parameters based on map data associated with a path from the current location to the destination location, and a safety logic implementing an emergency stop based on an error determined by the controller. The controller may monitor the location unit and the navigation module for the error.

The location unit may include a global positioning system (GPS) unit and the error may be a GPS error associated with signal loss or a real time kinematic (RTK) correction error. The autonomous ATV may include a sensor module sensing an obstacle along the path to the destination location, and the controller may monitor the sensor module for invalid sensor data as the error. The sensor module may include a light detection and ranging (LIDAR) sensor.

The safety logic may cause an interface to render a notification based on a battery level of the autonomous ATV and a distance of the path from the current location to the destination location when the autonomous ATV is an electric vehicle (EV). The safety logic may cause an interface to render a notification based on a fuel level of the autonomous ATV and the distance of the path from the current location to the destination location when the autonomous ATV is an internal combustion (IC) vehicle. The error may be a field-programmable gate array (FPGA) watchdog timer error. The safety logic may monitor the controller for errors and implement the emergency stop based on determining an error associated with the controller.

The autonomous ATV may include a communications module communicating with a remote device and the safety logic may monitor a distance between the remote device and the autonomous ATV and implement the emergency stop based on the distance exceeding an out of range threshold. The autonomous ATV may include a sensor module sensing a mechanical error associated with the autonomous ATV and the controller may monitor the sensor module for the error.

The autonomous ATV may include a controller area network (CAN) bus communicatively coupling the controller, the location unit, and the navigation module and the controller may monitor the CAN bus for delays in communication or a loss of frames associated with communications as the error.

The autonomous ATV may include a communications module receiving the map data associated with the path to the destination. The communications module may transmit the path from the current location to the destination location as a desired path to a server. The navigation module may determine a velocity or a steering angle as one or more of the driving parameters. The autonomous ATV may include a sensor module sensing a vehicle wheel speed of a wheel of the autonomous ATV and the navigation module may determine one or more of the driving parameters based on the vehicle wheel speed and the map data.

The autonomous ATV may include a drive controller driving a power steering system, a throttle control system, or a brake control system based on one or more of the driving parameters. The autonomous ATV may include a drive motor control system driving a motor controller based on one or more of the driving parameters. The autonomous ATV may be an electric vehicle (EV).

According to one aspect, an autonomous all-terrain vehicle (ATV) may include a controller receiving a command associated with autonomous driving and monitoring components of the autonomous ATV, a location unit determining a current location associated with the autonomous ATV and a destination location associated with the command, a sensor module sensing an obstacle along a path to the destination location, a navigation module determining one or more driving parameters based on map data associated with the path from the current location to the destination location and the sensed obstacle, and a safety logic implementing an emergency stop based on an error determined by the controller. The controller may monitor the location unit and the navigation module for the error.

The sensor module may include a light detection and ranging (LIDAR) sensor. The safety logic may causes an interface to render a notification based on a battery level of the autonomous ATV and a distance of the path from the current location to the destination location, when the autonomous ATV is an electric vehicle (EV) or a fuel level of the autonomous ATV and the distance of the path from the current location to the destination location, when the autonomous ATV is an internal combustion (IC) vehicle.

According to one aspect, a method for controlling an autonomous all-terrain vehicle (ATV) may include receiving a command associated with autonomous driving and monitoring components of the autonomous ATV, determining a current location associated with the autonomous ATV and a destination location associated with the command, determining one or more driving parameters based on map data associated with a path from the current location to the destination location, and performing an emergency stop based on an error determined by a controller or a safety logic of the autonomous ATV.

DETAILED DESCRIPTION

The following terms are used throughout the disclosure, the definitions of which are provided herein to assist in understanding one aspect of the disclosure.

"Vehicle", as used herein, refers to any moving vehicle that is capable of carrying one or more human occupants and is powered by any form of energy. In some cases, a motor vehicle includes one or more engines. The term "vehicle" may also refer to an autonomous vehicle and/or self-driving vehicle powered by any form of energy. The autonomous vehicle may carry one or more human occupants or other cargo. Further, the term "vehicle" may include vehicles that are automated or non-automated with pre-determined paths or free-moving vehicles. It will be appreciated that a vehicle may be an electric vehicle (EV) or an internal combustion (IC) vehicle with an internal combustion engine.

"Obstacle", as used herein, refers to any objects in a roadway or along a path being travelled by the vehicle and may include pedestrians, other vehicles, animals, debris, potholes, etc. Further, an 'obstacle' may include most any traffic condition, road condition, weather condition, features of the environment, etc. Examples of obstacles may include, but are not necessarily limited to other vehicles (e.g., obstacle vehicle), buildings, landmarks, obstructions in the roadway, road segments, intersections, etc. Thus, obstacles may be found, detected, or associated with a path, one or more road segments, etc. along a route on which the vehicle is travelling or is projected to travel along.

"Module", as used herein, includes, but is not limited to, a non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may include logic, a software controlled microprocessor, a discrete logic circuit, an analog circuit, a digital circuit, a programmed logic device, a memory device containing executing or executable instructions, logic gates, a combination of gates, and/or other circuit components, such as the modules, systems, devices, units, or any of the components of FIG. 1. Multiple modules may be combined into one module and single modules may be distributed among multiple modules.

"Bus", as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also be a vehicle bus that interconnects components inside a vehicle using protocols such as Media Oriented Systems Transport (MOST), Controller Area Network (CAN), Local Interconnect network (LIN), among others.

"Communication", as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

"Operable connection", as used herein, or a connection by which entities are "operably connected", is one in which signals, physical communications, and/or logical communications may be sent and/or received. An operable connection may include a wireless interface, a physical interface, a data interface, and/or an electrical interface. For example, one or more of the components of FIG. 1 may be operably connected with one another, thereby facilitating communication therebetween.

"Mobile device", as used herein, is a computing device typically having a display screen with user input (e.g., touch, keyboard) and a processor for computing. Mobile devices include, but are not limited to, handheld devices, portable devices, remote devices, smartphones, smartwatches, key fobs, laptops, tablets, and e-readers.

The term "V2X", as used herein, may be used to describe "vehicle-to-everything" communications, and variations of V2X designations may depend on the intended user that is transmitting DSRC signals, and "V2V" may be used to describe "vehicle-to-vehicle" communications.

The term "infer" or "inference", as used herein, generally refers to the process of reasoning about or inferring states of a system, a component, an environment, a user from one or more observations captured via events or data, etc. Inference may be employed to identify a context or an action or may be employed to generate a probability distribution over states, for example. An inference may be probabilistic. For example, computation of a probability distribution over states of interest based on a consideration of data or events. Inference may also refer to techniques employed for composing higher-level events from a set of events or data. Such inference may result in the construction of new events or new actions from a set of observed events or stored event data, whether or not the events are correlated in close temporal proximity, and whether the events and data come from one or several event and data sources.

Figure 1:
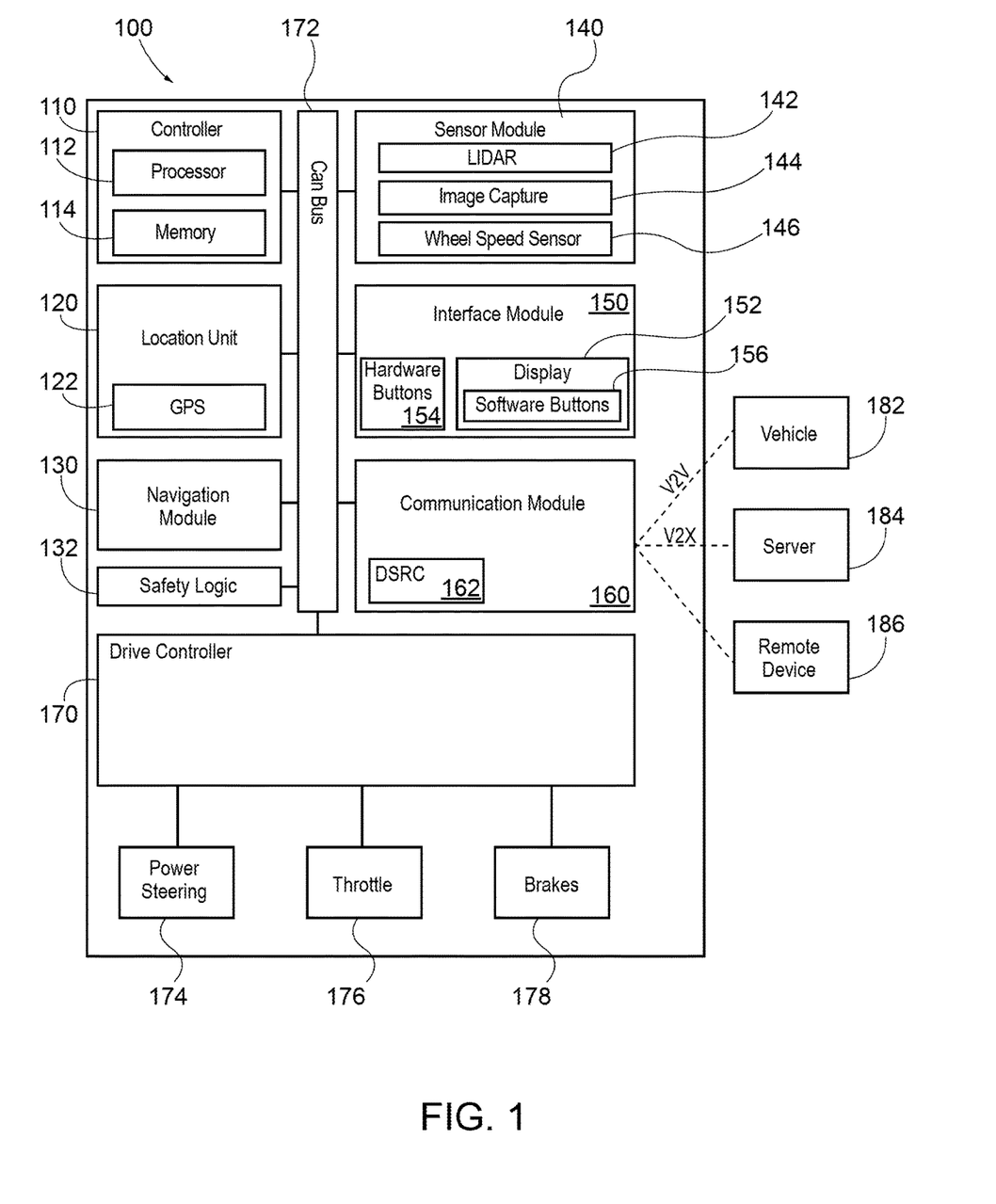
FIG. 1 is an illustration of an exemplary component diagram of a system for operation of an autonomous all-terrain vehicle (ATV), according to one aspect.

FIG. 1 is an illustration of an exemplary component diagram of a system 100 for operation of an autonomous all-terrain vehicle (ATV), according to one aspect. The system 100 for operation of an autonomous ATV may include a controller 110 which includes a processor 112 and a memory 114, a location unit 120 which includes a global positioning system (GPS) unit 122, a navigation module 130, a safety logic 132, a sensor module 140 which may include a light detection and ranging (LIDAR) sensor, an image capture device 144, a wheel speed sensor 146, an interface module 150 which may include a display 152, hardware buttons 154 (e.g., an emergency stop button), and/or software buttons 156, a communications module 160 which may include a dedicated short range communications (DSRC) antenna 162, and a drive controller driving a power steering system 174, a throttle control system 176, or a brake control system 178. A controller area network (CAN) bus 172 may communicatively couple one or more of these aforementioned components, thereby enabling communication between the respective components. Stated another way, the modules and components of FIG. 1 may be operably connected and communicate among each other via the CAN bus 172. According to one aspect, the system 100 for operation of an autonomous ATV may be implemented as a part of an internal combustion (IC) autonomous ATV.

Figure 2:
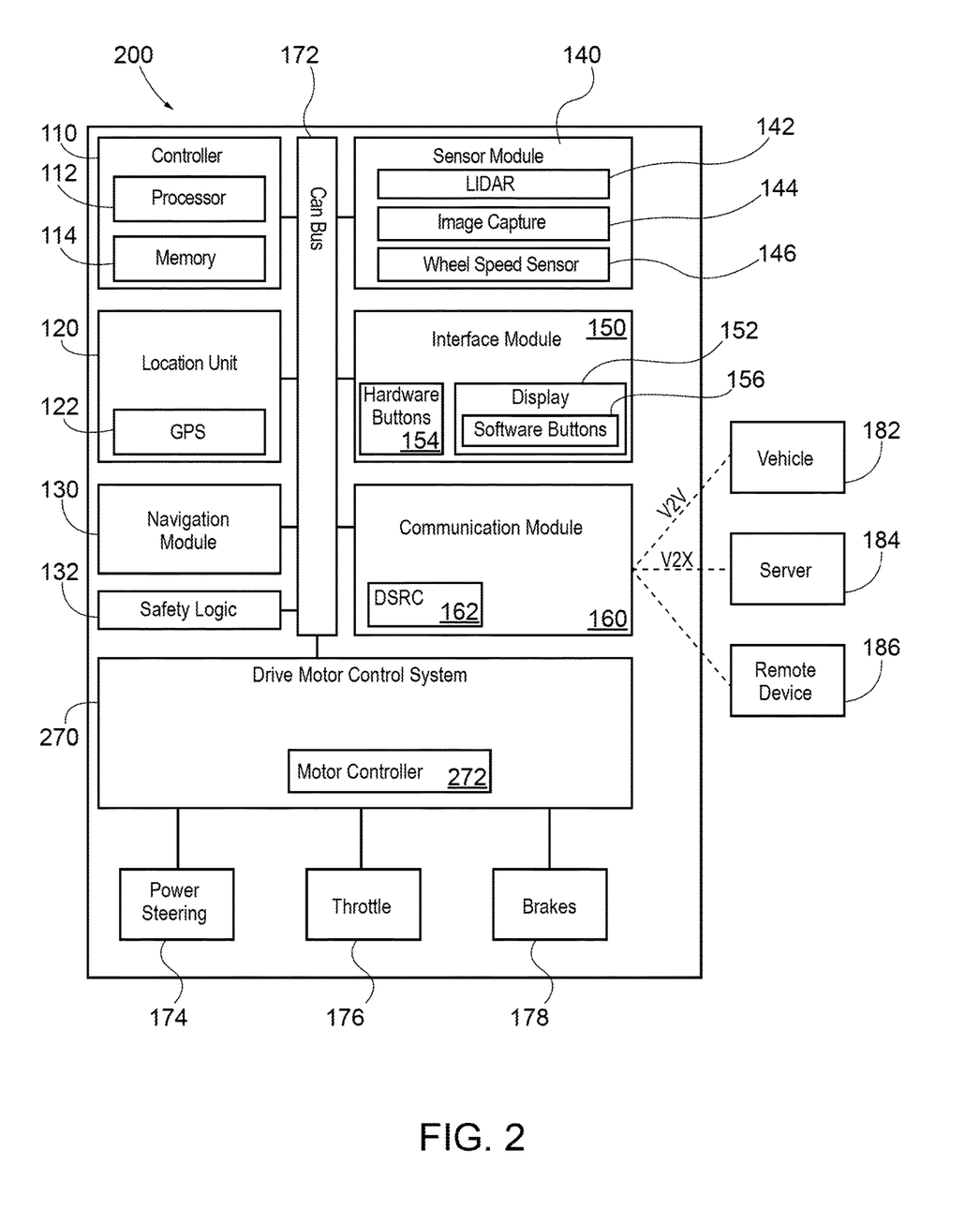
FIG. 2 is an illustration of an exemplary component diagram of a system for operation of an autonomous all-terrain vehicle (ATV), according to one aspect.

FIG. 2 is an illustration of an exemplary component diagram of a system 100 for operation of an autonomous all-terrain vehicle (ATV), according to one aspect. The system 200 of FIG. 2 is similar to the system 100 of FIG. 1, except that the system 200 of FIG. 2 is for an electric vehicle (EV) version of the autonomous ATV, which may include a drive motor control system 270 driving a motor controller 272 rather than the drive controller 170 of the system 100 of FIG. 1. Although one or more of the components may be described with respect to the system 100 for operation of an autonomous ATV of FIG. 1, it will be appreciated that the corresponding components of FIG. 2 may be configured and/or perform similar functions and concepts or features associated with the EV may be applied to the IC autonomous ATV of FIG. 1 and vice versa.

In any event, regardless of whether the autonomous ATV is an EV or IC version of the ATV, the controller 110 may receive one or more commands associated with autonomous driving of the vehicle. These commands may be initiated, for example, at the interface module 150 via one or more of the hardware buttons 154 or one or more of the software buttons 156, or via a remote device, such as a remote control for the autonomous ATV.

The location unit 120 may include the GPS unit 122 and determine a current location associated with the autonomous ATV, as well as a destination location associated with the command for autonomous driving. In this way, the location unit 120 may receive a GPS location associated with the autonomous ATV, such as by locating the autonomous ATV using satellites, thereby providing a precise set of geographical coordinates associated with the autonomous ATV.

The communications module 160 may receive information from one or more sources, such as, for example, other vehicles 182, a server 184, or the remote device 186. Examples of information which may be received include map data associated with a current path, such as the path from the current location of the autonomous ATV to the destination location.

The navigation module 130 may determine a route, based on map information from the communications module 160 or stored locally on the memory 114 of the autonomous ATV, from the current location of the autonomous ATV to the destination location. According to one aspect, the navigation module 130 may determine the route based on obstacles detected by the sensor module 140. In other words, the navigation module 130 may identify a potential path in the operating environment through which the autonomous ATV may pass. The navigation module 130 may also present information to a driver or occupant of the autonomous ATV via the interface to show progress of a trip.

The sensor module 140 may include different types of sensors, such as a Light Detection and Ranging (LIDAR) sensor 142, the image capture device 144, a radar sensor, etc. In this way, the LIDAR sensor 142 may be a light based sensor which facilitates object detection or environment detection. Regardless, the sensor module 140 may sense or detect an obstacle around the autonomous ATV. If the sensor module 140 detects an obstacle which is obstructing a path associated with the autonomous ATV, the navigation module 130 may, in response, modify a route or current route of the autonomous ATV to navigate around the detected obstacle, thereby enabling the sensor module 140 to identify potential paths from a current location associated with the autonomous ATV to a current location of the leader or leader device.

For example, when the sensor module 140 detects an obstacle, the navigation module 130 may make a determination as to whether a route change or an alternative route should be considered. The navigation module 130 may make this determination based on a size of the obstacle, topology of alternative routes, a state of the surrounding environment, etc. For example, if ground conditions are muddy, rainy, slick, icy, snowy, dry, etc. the navigation module 130 may recommend or determine the alternative route accordingly.

In other words, when the sensor module 140 detects the obstacle in an operating environment through which the autonomous ATV is travelling, the navigation module 130 determines whether the obstacle impedes a current route of the autonomous ATV. Stated another way, the navigation module 130 may determine an alternative current route for the autonomous ATV based on the current route, whether the obstacle impedes the current route of the autonomous ATV, and a feature of the operating environment (e.g., topology, whether the terrain is passable, weather, ground conditions, ice thickness associated with a body of water, difficulty associated with an alternative route, etc.).

Additionally, the navigation module 130 may determine one or more driving parameters to be implemented by one or more components of the autonomous ATV during autonomous travel. For example, the navigation module 130 may determine one or more driving parameters based on map data and/or sensed obstacles associated with the path from the current location to the destination location. Examples of driving parameters associated with vehicle components include coordinate information, velocity, acceleration, trajectory, yaw rate, steering angle, throttle angle, etc. If the terrain surround the autonomous ATV is steep, the navigation module 130 may decrease a gear of the vehicle and/or determine a lower velocity than if the terrain were flat.

The sensor module 140 may include the wheel speed sensor 146 detecting an angular velocity of a wheel of the autonomous ATV. As such, the navigation module 130 may determine one or more of the driving parameters based on the vehicle wheel speed and the map data. For example, a lookup table may be provided on the server 184 based on an incline angle, temperature, humidity, road surface conditions, terrain type (e.g., rock, gravel, grass, mud, snow, ice), etc. to determine one or more of the corresponding driving parameters.

According to one or more aspects, the safety logic 132 may implement an emergency stop based on an error determined by the controller 110 or an error determined by the safety logic 132. In other words, the controller 110 may monitor the location unit 120, the navigation module 130, the sensor module 140, the interface module 150, the communications module 160, the drive controller 170, or the CAN bus 172 for the error. Examples of errors determined by the controller 110 may include a GPS error associated with signal loss or a real time kinematic (RTK) correction error, invalid sensor data from the sensor module 140, a field-programmable gate array (FPGA) watchdog timer error, mechanical errors sensed by the sensor module 140 (e.g., errors associated with the brake control system 178, the power steering system 174, and the throttle control system 176, etc.). According to one aspect, the sensor module 140 may include the wheel speed sensor 146, which detects an angular velocity of a wheel of the autonomous ATV. In this regard, the safety logic 132 may determine or implement the emergency stop based on the wheel speed sensor data.

Other errors may include a CAN bus error, such as a delay in communication between one or more of the components of FIG. 1 or a loss of frames, for example.

Further, the safety logic 132 may monitor the controller 110 for errors associated with the controller 110. In this way, even if the controller 110 were to malfunction, another component of the autonomous ATV may detect such an error. Thus, if the safety logic 132 detects an error associated with the controller 110, the safety logic 132 would, in response to this error, implement the emergency stop based on the determined error associated with the controller 110 and based on the maps information and surrounding terrain. For example, in a hilly environment, the safety logic 132 may implement the emergency stop as a gradual increasing application of the brakes, rather than as a sudden stop, which may be implemented if the sensor module 140 detects a sudden obstacle, such as a pedestrian moving in front of the autonomous ATV.

Additionally, the safety logic 132 may causes the interface to render, on the display 152 of the autonomous ATV or on a display of the remote device 186, a notification based on a battery level of the autonomous ATV and a distance of the path from the current location to the destination location. In other words, if the autonomous ATV is an EV, and the battery level of the autonomous ATV is below a threshold level associated with a round trip (e.g., due to the distance of the round trip, due the terrain associated with the round trip, such as hills, inclines, surface conditions, etc.), the safety logic 132 may cause the interface to render a corresponding warning. In some scenarios, other factors may be considered, such as peak output of the battery (e.g., the EV autonomous ATV may not be able to make it up an incline at x distance at a battery level while being able to traverse x distance on a flat path due to the current being drawn). Similarly, if the if the autonomous ATV is an internal combustion (IC) vehicle, and a fuel level of the autonomous ATV is below a threshold level associated with a round trip (e.g., taking into account the terrain associated with the round trip, such as hills, inclines, surface conditions, etc.), the safety logic 132 may cause the interface to render a corresponding warning.

As another example, if the autonomous ATV is being controlled by the remote device 186 (e.g., the remote device is being used as a remote control to transmit autonomous driving commands to the autonomous ATV via the communications module 160), the safety logic 132 may monitor a distance between the remote device 186 and the autonomous ATV. When the distance between the remote device 186 and the autonomous ATV increases past an out of range threshold distance, the safety logic 132 may cause the interface to render an out of range warning or the safety logic 132 may implement the emergency stop. According to one aspect, the out of range warning may be provided at a first out of range threshold distance and the emergency stop may be applied at a second out of range threshold distance, where the second out of range threshold distance is greater than the first out of range threshold distance.

The sensor module 140 may sense an obstacle along the path from the current location of the autonomous ATV to the destination location. Further, the sensor module 140 may sense errors associated with one or more autonomous ATV vehicle components, including but not limited to the brake control system 178, the power steering system 174, and the throttle control system 176, for example.

The interface module 150 may render information associated with a path, route, or trip for a passenger, driver, or occupant of the autonomous ATV, such as via the display 152. The interface module 150 may also include a touch screen interface, for example. Additionally, when a button is pressed, the interface module 150 may transmit a corresponding command, via the CAN bus 172, to the controller 110 of the autonomous ATV. In this regard, the controller 110 may receive the corresponding command from the interface module 150 and facilitate execution of that command (e.g., drive autonomously to a 'home' location).

The communications module 160 may facilitate V2V and/or V2X communications. The communications module 160 may include the DSRC module 162, an antenna, a receiver, a transmitter, and/or a transceiver. The communications module 160 may receive information from external sources, such as another vehicle 182 (e.g., thereby facilitating V2V communications), a server 184 (e.g., thereby facilitating V2X communications), a remote device 186, etc. For example, the communications module 160 may receive obstacle or environment information associated with the operating environment from the other vehicle or map information from the server 184. In this way, the communications module 160 may receive a variety of information from different sources. For example, the communications module 160 may transmit a path from the current location to the destination location as a desired path to the server 184.

The drive controller 170 or the drive motor control system 270 may control aspects of autonomous driving by implemented one or more of driving parameters. For example, the drive controller 170 may drive the power steering system 174, the throttle control system 176, or the brake control system 178, while the drive motor control system may drive the motor controller 272, thereby implementing the driving parameters as an operating action or autonomous driving action.

Figure 3:
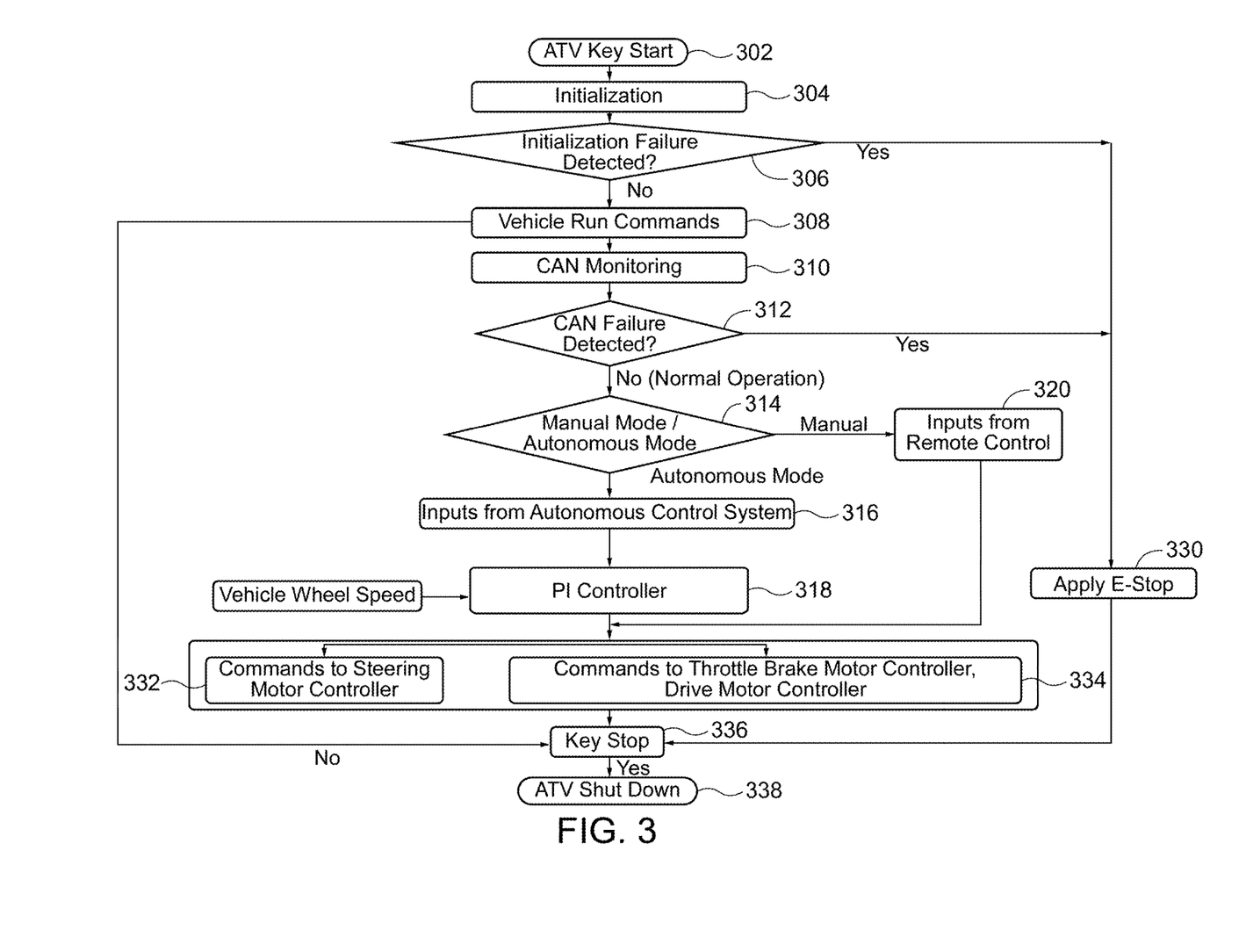
FIG. 3 is an illustration of an exemplary flow diagram of a method for operation of an autonomous ATV, according to one aspect.

FIG. 3 is an illustration of an exemplary flow diagram of a method for operation of an autonomous ATV, according to one aspect. At 302, the autonomous ATV may be started. At 304, system initialization may occur, including initialization of the controller 110, the CAN bus 172, and/or one or more other components. At 306, one or more failures may be checked. An example of the failure check may include a check for one or more mechanical failures or mechanical errors. In other words, the controller 110 or the safety logic 132 may determine whether any mechanical errors are present at 306. If no errors are detected at 306, the autonomous ATV may run initialization commands at 308. At 310, the controller 110 may monitor the CAN for errors. At 312, the controller 110 may determine whether a CAN failure or error is detected. If no CAN error is detected at 312, the system may enter manual mode or autonomous mode at 314.

In autonomous mode, the autonomous ATV may receive inputs from the autonomous control system (e.g., the controller 110, navigation module 130, sensor module 140, etc.) at 316. In other words, one or more driving parameters may be determined based on map data associated with a path from a current location to a destination location.

At 318, other system inputs may be monitored, such as the vehicle wheel speed. In response, the navigation module 130 may determine one or more driving parameters and provide these as commands to the motor controller at 332 or as commands to the throttle, brake, motor controller and the drive motor controller at 334. At 336, the ATV may be stopped in a normal fashion (e.g., key stop) and shut down 338. In manual mode, inputs may be received from the remote control at 320. If errors are detected, at 306 or 312, an emergency stop may be implemented at 330, and thus an emergency stop may be performed based on an error determined by a controller 110 or a safety logic 132 of the autonomous ATV.

Figure 4:
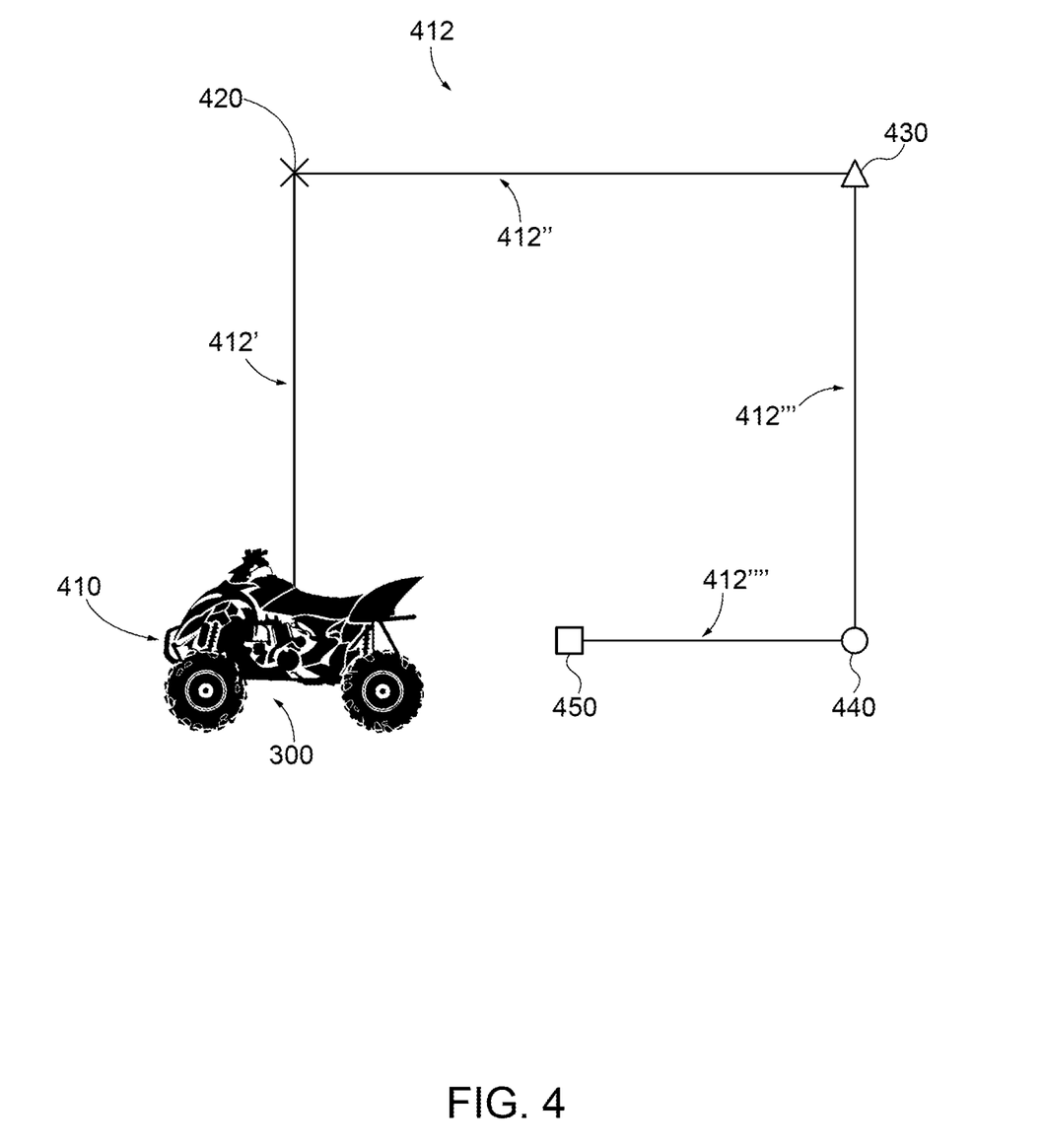
FIG. 4 is an illustration of an exemplary usage scenario for the system for operation of the autonomous ATV of FIG. 1 or FIG. 2.

FIG. 4 is an illustration of an exemplary usage scenario for the system for operation of the autonomous ATV of FIG. 1 or FIG. 2. In FIG. 4, an autonomous ATV may travel from a current location 410 autonomously along path 412, from 410 to 420, to 430 to 440 (following 412', 412", 412''', 412''''), which may be waypoints set by the navigation module 130 in association with determination of the route from the current location to the destination location. At 450, an emergency stop may be performed or implemented by the safety logic 132 based on one or more of the aforementioned errors, such as a GPS error associated with signal loss or a real time kinematic (RTK) correction error, invalid sensor data from the sensor module 140, a FPGA watchdog timer error, or a mechanical error.

Figure 5:
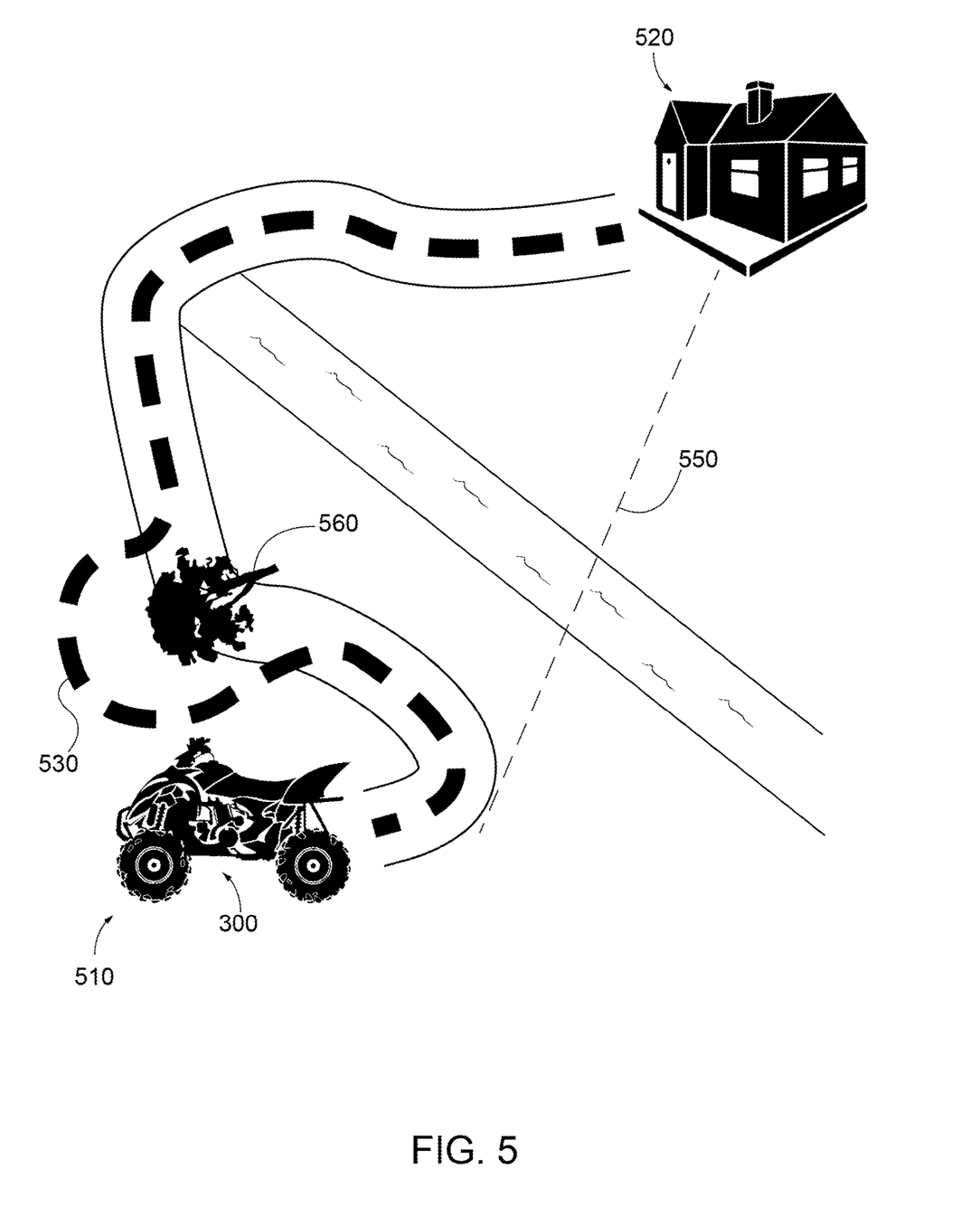
FIG. 5 is an illustration of an exemplary usage scenario for the system for operation of the autonomous ATV of FIG. 1 or FIG. 2.

FIG. 5 is an illustration of an exemplary usage scenario for the system for operation of the autonomous ATV of FIG. 1 or FIG. 2. In FIG. 5, the autonomous ATV may utilize the LIDAR sensor 142 and/or maps information received from the server 184 to determine a path from the start location 510 to the home location 520 to facilitate a drive 'home' autonomous operation. Based on the maps information, a first route 530 may be determined or a second route 550 may be determined. The first route 530 is more on road, although an obstacle 560 (e.g., a downed tree) may cause the navigation module 130 to determine an alternative slightly off-road travel segment at 560 to mitigate a collision with the obstacle 560. Based on maps information, weather information received via the communications module 160, (e.g., whether the creek is frozen over or the depth of the water if not frozen) the navigation module 130 may determine that the second route 550 as the selected route. In this way, control of the autonomous ATV may be provided.

Figure 6:
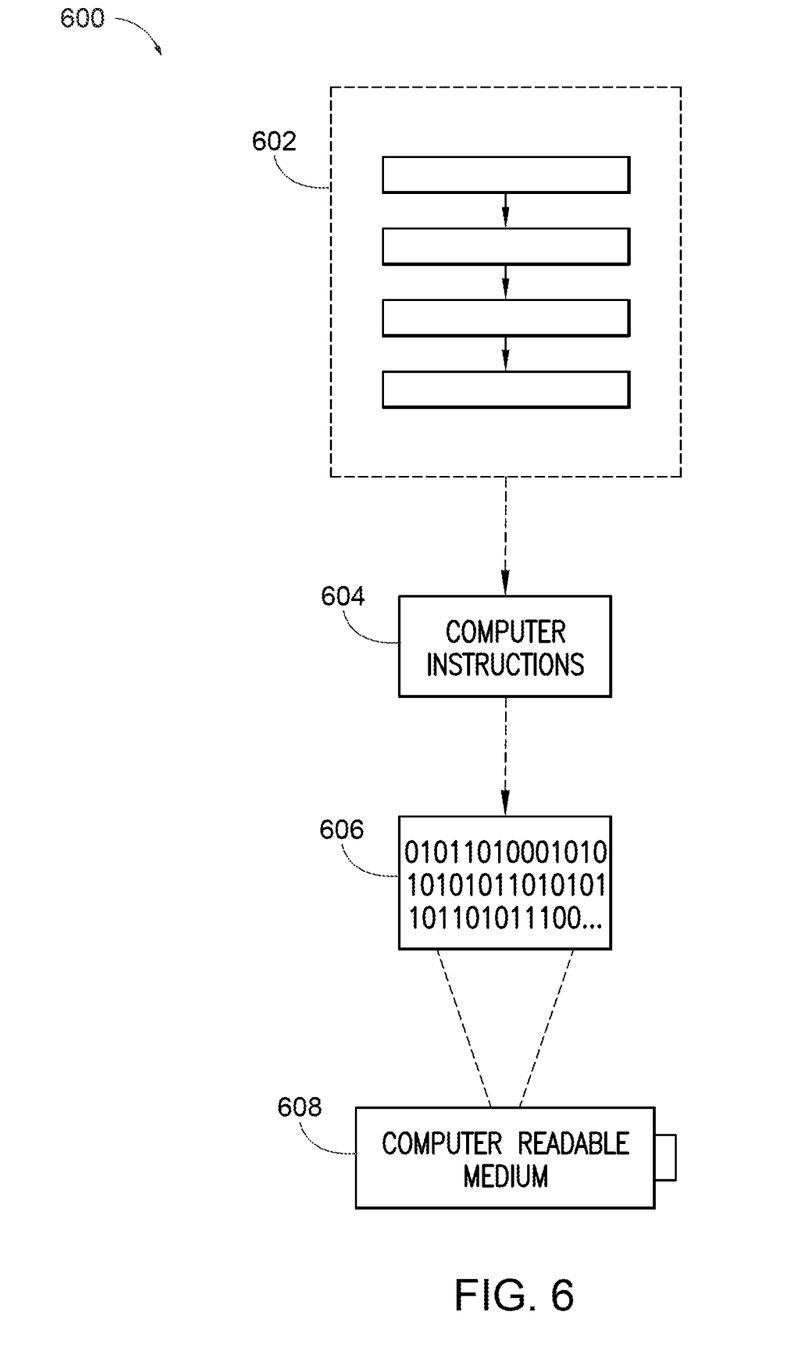
FIG. 6 is an illustration of an example computer-readable medium or computer-readable device including processor-executable instructions configured to embody one or more of the provisions set forth herein, according to one aspect.

Still another aspect involves a computer-readable medium including processor-executable instructions configured to implement one aspect of the techniques presented herein. An embodiment of a computer-readable medium or a computer-readable device devised in these ways is illustrated in FIG. 6, wherein an implementation 600 includes a computer-readable medium 608, such as a CD-R, DVD-R, flash drive, a platter of a hard disk drive, etc., on which is encoded computer-readable data 606. This encoded computer-readable data 606, such as binary data including a plurality of zero's and one's as shown in 606, in turn includes a set of processor-executable computer instructions 604 configured to operate according to one or more of the principles set forth herein. In one such aspect 600, the processor-executable computer instructions 604 may be configured to perform a method 602, such as the method 300 of FIG. 3. In another aspect, the processor-executable computer instructions 604 may be configured to implement a system, such as the system 100 of FIG. 1 or the system 200 of FIG. 2. Many such computer-readable media may be devised by those of ordinary skill in the art that are configured to operate in accordance with the techniques presented herein.

As used in this application, the terms "component", "module", "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Figure 7:
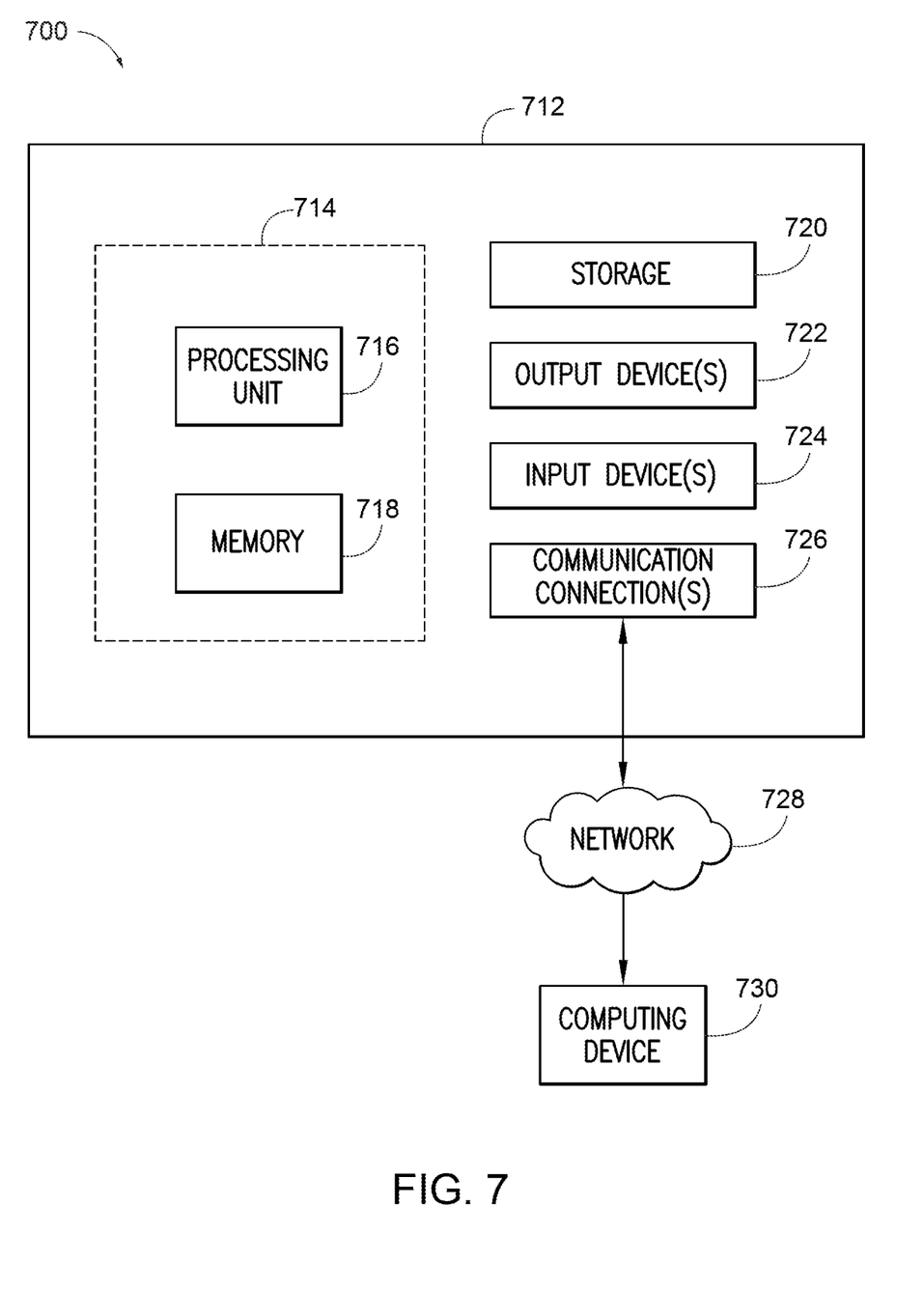
FIG. 7 is an illustration of an example computing environment where one or more of the provisions set forth herein are implemented, according to one aspect.

FIG. 7 and the following discussion provide a description of a suitable computing environment to implement embodiments of one or more of the provisions set forth herein. The operating environment of FIG. 7 is merely one example of a suitable operating environment and is not intended to suggest any limitation as to the scope of use or functionality of the operating environment. Example computing devices include, but are not limited to, personal computers, server computers, handheld or laptop devices, mobile devices, such as mobile phones, Personal Digital Assistants (PDAs), media players, and the like, multiprocessor systems, consumer electronics, mini computers, mainframe computers, distributed computing environments that include any of the above systems or devices, etc.

Generally, embodiments are described in the general context of "computer readable instructions" being executed by one or more computing devices. Computer readable instructions may be distributed via computer readable media as will be discussed below. Computer readable instructions may be implemented as program modules, such as functions, objects, Application Programming Interfaces (APIs), data structures, and the like, that perform one or more tasks or implement one or more abstract data types. Typically, the functionality of the computer readable instructions are combined or distributed as desired in various environments.

FIG. 7 illustrates a system 700 including a computing device 712 configured to implement one aspect provided herein. In one configuration, computing device 712 includes at least one processing unit 716 and memory 718. Depending on the exact configuration and type of computing device, memory 718 may be volatile, such as RAM, non-volatile, such as ROM, flash memory, etc., or a combination of the two. This configuration is illustrated in FIG. 7 by dashed line 714.

In other embodiments, computing device 712 includes additional features or functionality. For example, computing device 712 may include additional storage such as removable storage or non-removable storage, including, but not limited to, magnetic storage, optical storage, etc. Such additional storage is illustrated in FIG. 7 by storage 720. In one aspect, computer readable instructions to implement one aspect provided herein are in storage 720. Storage 720 may store other computer readable instructions to implement an operating system, an application program, etc. Computer readable instructions may be loaded in memory 718 for execution by processing unit 716, for example.

The term "computer readable media" as used herein includes computer storage media. Computer storage media includes volatile and nonvolatile, removable and non-removable media implemented in any method or technology for storage of information such as computer readable instructions or other data. Memory 718 and storage 720 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which may be used to store the desired information and which may be accessed by computing device 712. Any such computer storage media is part of computing device 712.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Computing device 712 includes input device(s) 724 such as keyboard, mouse, pen, voice input device, touch input device, infrared cameras, video input devices, or any other input device. Output device(s) 722 such as one or more displays, speakers, printers, or any other output device may be included with computing device 712. Input device(s) 724 and output device(s) 722 may be connected to computing device 712 via a wired connection, wireless connection, or any combination thereof. In one aspect, an input device or an output device from another computing device may be used as input device(s) 724 or output device(s) 722 for computing device 712. Computing device 712 may include communication connection(s) 726 to facilitate communications with one or more other devices 730, such as through network 728, for example.

Although the subject matter has been described in language specific to structural features or methodological acts, it is to be understood that the subject matter of the appended claims is not necessarily limited to the specific features or acts described above. Rather, the specific features and acts described above are disclosed as example embodiments.

Various operations of embodiments are provided herein. The order in which one or more or all of the operations are described should not be construed as to imply that these operations are necessarily order dependent. Alternative ordering will be appreciated based on this description. Further, not all operations may necessarily be present in each embodiment provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An autonomous all-terrain vehicle (ATV), comprising:
a controller receiving a command associated with autonomous driving and monitoring components of the autonomous ATV;
a location unit, implemented as a global positioning system (GPS) device, determining a current location associated with the autonomous ATV and a destination location associated with the command;
a navigation module, implemented via a processor and a memory, determining one or more driving parameters based on map data associated with a path from the current location to the destination location; and
a safety logic implementing an emergency stop based on an error determined by the controller and based on a battery level of the autonomous ATV, wherein the controller monitors the location unit and the navigation module for the error.

2. The autonomous ATV of claim 1, wherein the location unit includes a global positioning system (GPS) unit and wherein the error is a GPS error associated with signal loss or a real time kinematic (RTK) correction error.

3. The autonomous ATV of claim 1, comprising a sensor module sensing an obstacle along the path to the destination location, and wherein the controller monitors the sensor module for invalid sensor data as the error.

4. The autonomous ATV of claim 3, wherein the sensor module includes a light detection and ranging (LIDAR) sensor.

5. The autonomous ATV of claim 1, wherein the safety logic causes an interface to render a notification based on:
the battery level of the autonomous ATV and a distance of the path from the current location to the destination location, wherein the autonomous ATV is an electric vehicle (EV); or
a fuel level of the autonomous ATV and the distance of the path from the current location to the destination location, wherein the autonomous ATV is an internal combustion (IC) vehicle.

6. The autonomous ATV of claim 1, wherein the error is a field-programmable gate array (FPGA) watchdog timer error.

7. The autonomous ATV of claim 1, wherein the safety logic monitors the controller for errors and implements the emergency stop based on determining an error associated with the controller.

8. The autonomous ATV of claim 1, comprising a communications module communicating with a remote device, wherein the safety logic monitors a distance between the remote device and the autonomous ATV and implements the emergency stop based on the distance exceeding an out of range threshold.

9. The autonomous ATV of claim 1, comprising a sensor module sensing a mechanical error associated with the autonomous ATV, and wherein the controller monitors the sensor module for the error.

10. The autonomous ATV of claim 1, comprising a controller area network (CAN) bus communicatively coupling the controller, the location unit, and the navigation module, wherein the controller monitors the CAN bus for delays in communication or a loss of frames associated with communications as the error.

11. The autonomous ATV of claim 1, comprising a communications module receiving the map data associated with the path to the destination.

12. The autonomous ATV of claim 11, wherein the communications module transmits the path from the current location to the destination location as a desired path to a server.

13. The autonomous ATV of claim 1, wherein the navigation module determines a velocity or a steering angle as one or more of the driving parameters.

14. The autonomous ATV of claim 1, comprising a sensor module sensing a vehicle wheel speed of a wheel of the autonomous ATV, wherein the navigation module determines one or more of the driving parameters based on the vehicle wheel speed and the map data.

15. The autonomous ATV of claim 1, comprising a drive controller driving a power steering system, a throttle control system, or a brake control system based on one or more of the driving parameters.

16. The autonomous ATV of claim 1, comprising a drive motor control system driving a motor controller based on one or more of the driving parameters, wherein the autonomous ATV is an electric vehicle (EV).

17. An autonomous all-terrain vehicle (ATV), comprising:
  a controller receiving a command associated with autonomous driving and monitoring components of the autonomous ATV;
  a location unit, implemented as a global positioning system (GPS) device, determining a current location associated with the autonomous ATV and a destination location associated with the command;
  a sensor module sensing an obstacle along a path to the destination location;
  a navigation module, implemented via a processor and a memory, determining one or more driving parameters based on map data associated with the path from the current location to the destination location and the sensed obstacle; and
  a safety logic implementing an emergency stop based on an error determined by the controller and based on a battery level of the autonomous ATV, wherein the controller monitors the location unit and the navigation module for the error.

18. The autonomous ATV of claim 17, wherein the sensor module includes a light detection and ranging (LIDAR) sensor.

19. The autonomous ATV of claim 17, wherein the safety logic causes an interface to render a notification based on:
  the battery level of the autonomous ATV and a distance of the path from the current location to the destination location, wherein the autonomous ATV is an electric vehicle (EV); or
  a fuel level of the autonomous ATV and the distance of the path from the current location to the destination location, wherein the autonomous ATV is an internal combustion (IC) vehicle.

20. A system, comprising:
  a controller receiving a command associated with autonomous driving and monitoring components of an autonomous all-terrain vehicle (ATV), the controller located within the autonomous ATV;
  a location unit, implemented as a global positioning system (GPS) device, determining a current location associated with the autonomous ATV and a destination location associated with the command;
  a navigation module, implemented via a processor and a memory, determining one or more driving parameters based on map data associated with a path from the current location to the destination location; and
  a safety logic implementing an emergency stop based on an error determined by the controller and based on a battery level of the autonomous ATV, wherein the controller monitors the location unit and the navigation module for the error.

* * * * *